US011485683B2

(12) United States Patent
Kraus et al.

(10) Patent No.: US 11,485,683 B2
(45) Date of Patent: Nov. 1, 2022

(54) POLYCONDENSATE BASED WATER-REDUCER

(71) Applicant: Construction Research & Technology, GmbH, Trostberg (DE)

(72) Inventors: Alexander Kraus, Pittenhart (DE); Annmarie Kuehn, Traunwalchen (DE); Stefanie Kuenzner, Taufkirchen (DE)

(73) Assignee: Construction Research & Technology GmbH, Trostberg (DE)

( * ) Notice: Subject to any disclaimer, the term of this patent is extended or adjusted under 35 U.S.C. 154(b) by 494 days.

(21) Appl. No.: 16/062,465

(22) PCT Filed: Dec. 16, 2016

(86) PCT No.: PCT/EP2016/081590
§ 371 (c)(1),
(2) Date: Jun. 14, 2018

(87) PCT Pub. No.: WO2017/103215
PCT Pub. Date: Jun. 22, 2017

(65) Prior Publication Data
US 2019/0010090 A1  Jan. 10, 2019

(30) Foreign Application Priority Data
Dec. 17, 2015  (EP) ..................... 15200816

(51) Int. Cl.
*C04B 24/24* (2006.01)
*C08G 65/335* (2006.01)
*C08G 8/36* (2006.01)
*C08G 65/26* (2006.01)
*C08G 65/331* (2006.01)
*C08G 8/18* (2006.01)
*C04B 28/02* (2006.01)
*C04B 28/04* (2006.01)
*C04B 28/14* (2006.01)
*C08G 65/34* (2006.01)
*C04B 103/30* (2006.01)
*C04B 103/40* (2006.01)

(52) U.S. Cl.
CPC ............ *C04B 24/246* (2013.01); *C04B 28/02* (2013.01); *C04B 28/04* (2013.01); *C04B 28/146* (2013.01); *C04B 28/147* (2013.01); *C08G 8/18* (2013.01); *C08G 8/36* (2013.01); *C08G 65/2612* (2013.01); *C08G 65/3317* (2013.01); *C08G 65/3353* (2013.01); *C08G 65/34* (2013.01); *C04B 2103/308* (2013.01); *C04B 2103/408* (2013.01)

(58) Field of Classification Search
CPC ....... C04B 24/246; C04B 28/02; C04B 28/04; C04B 28/146; C04B 28/147; C08G 8/18; C08G 8/36; C08G 65/2612; C08G 65/3353; C08G 65/3317; C08G 65/34
See application file for complete search history.

(56) References Cited

U.S. PATENT DOCUMENTS

| 2,499,370 | A | 3/1950 | Degroote et al. |
| 3,275,667 | A | 9/1966 | Bohunek |
| 3,471,576 | A | 10/1969 | Klesper et al. |
| 3,583,486 | A | 6/1971 | Stratton |
| 3,674,723 | A | 7/1972 | Vredenburgh et al. |
| 3,699,173 | A | 10/1972 | Osberg et al. |
| 3,870,681 | A | 3/1975 | Falkehag et al. |
| 3,954,808 | A | 5/1976 | Elliott et al. |
| 4,001,329 | A | 1/1977 | Bell |
| 4,032,514 | A | 6/1977 | Buriks et al. |
| 4,053,447 | A | 10/1977 | Shea |
| 4,076,873 | A | 2/1978 | Shea |
| 4,098,717 | A | 7/1978 | Buriks et al. |
| 4,107,127 | A | 8/1978 | Shea |
| 4,209,422 | A | 6/1980 | Zimmerman et al. |
| 4,349,386 | A | 9/1982 | Davidovits |
| 4,430,469 | A | 2/1984 | Burge et al. |
| 4,472,199 | A | 9/1984 | Davidovits |

(Continued)

FOREIGN PATENT DOCUMENTS

| CA | 2071051 | 12/1992 |
| CA | 2172004 | 9/1996 |

(Continued)

OTHER PUBLICATIONS

European Search Report for EP Patent Application No. 15200816.5, dated Jun. 1, 2016, 3 pages.

(Continued)

*Primary Examiner* — John E Uselding
(74) *Attorney, Agent, or Firm* — Curatolo, Sidoti & Trillis Co., LPA; Salvatore A. Sidoti; Floyd Trillis, III

(57) ABSTRACT

The present invention relates to polycondensates containing at least a structural unit, which is an aromatic moiety bearing a polyether side chain, at least a structural unit, which is an aromatic moiety bearing at least one phosphoric acid monoester group, at least a structural unit, which is an aromatic moiety, bearing at least one hydroxy group and at least a methylene unit (—CH$_2$—), which is attached to two aromatic structural units. The invention also concerns a process for the production of the polycondensates, their use for the dispersion of inorganic binders, for increasing the strength development of concrete and for improving the slump-retention of concrete. The invention relates also to building material mixtures comprising the polycondensates and inorganic binders.

17 Claims, No Drawings

(56) References Cited

U.S. PATENT DOCUMENTS

| | | |
|---|---|---|
| 4,473,669 A | 9/1984 | Rupert et al. |
| 4,509,985 A | 4/1985 | Davidovits |
| 4,600,518 A | 7/1986 | Ries et al. |
| 4,725,665 A | 2/1988 | Pieh et al. |
| 4,778,654 A | 10/1988 | Bacskai et al. |
| 4,839,460 A | 6/1989 | Molzahn |
| 4,952,732 A | 8/1990 | Speranza et al. |
| 5,075,414 A | 12/1991 | Dailey, Jr. |
| 5,262,104 A | 10/1993 | Baumann |
| 5,272,226 A | 12/1993 | Lancaster et al. |
| 5,332,041 A | 7/1994 | Onan et al. |
| 5,355,954 A | 10/1994 | Onan et al. |
| 5,356,938 A | 10/1994 | Weiser et al. |
| 5,360,841 A | 11/1994 | Knop et al. |
| 5,372,909 A | 12/1994 | Nishi et al. |
| 5,413,634 A | 5/1995 | Shawl et al. |
| 5,473,045 A | 12/1995 | Sizensky et al. |
| 5,609,680 A | 3/1997 | Kobayashi et al. |
| 5,614,017 A | 3/1997 | Shawl |
| 5,620,949 A | 4/1997 | Baker et al. |
| 5,651,817 A | 7/1997 | Yamato et al. |
| 5,637,658 A | 8/1997 | Teodorczyk |
| 5,707,445 A | 1/1998 | Yamato et al. |
| 5,709,743 A | 1/1998 | Leture et al. |
| 5,779,742 A | 7/1998 | Baker |
| 5,840,795 A | 11/1998 | Freeman et al. |
| 5,856,279 A | 1/1999 | Baker |
| 5,925,184 A | 7/1999 | Hirata et al. |
| 6,048,659 A | 4/2000 | Inoue et al. |
| 6,147,036 A | 11/2000 | Baker |
| 6,170,574 B1 | 1/2001 | Jones |
| 6,376,581 B1 | 4/2002 | Tanaka et al. |
| 6,387,176 B1 | 5/2002 | Widmer et al. |
| 6,462,110 B2 | 10/2002 | Satoh et al. |
| 6,555,683 B1 | 4/2003 | Weichmann et al. |
| 6,780,511 B2 | 8/2004 | Gerber |
| 6,832,652 B1 | 12/2004 | Dillenbeck et al. |
| 7,022,768 B1 | 4/2006 | Lacroix et al. |
| 7,041,167 B2 | 5/2006 | Jiang |
| 7,119,152 B1 | 10/2006 | Lacroix et al. |
| 7,258,736 B2 | 8/2007 | Oriakhi et al. |
| 7,425,596 B2 | 9/2008 | Kraus et al. |
| 7,605,196 B2 | 10/2009 | Schinabeck et al. |
| 7,641,731 B2 | 1/2010 | Chanut et al. |
| 7,772,300 B2 | 8/2010 | Schinabeck et al. |
| 7,910,640 B2 | 3/2011 | Wieland et al. |
| 8,053,498 B2 | 11/2011 | Wieland et al. |
| 8,202,362 B2 | 6/2012 | Davidovits et al. |
| 8,349,960 B2 | 1/2013 | Gaeberlein et al. |
| 8,436,372 B2 | 5/2013 | Herth et al. |
| 8,470,907 B2 | 6/2013 | Reichenbach-Klinke et al. |
| 8,853,186 B2 | 2/2014 | Nicoleau et al. |
| 8,907,016 B2 | 12/2014 | Vierle et al. |
| 9,006,313 B2 | 4/2015 | Kraus et al. |
| 9,018,337 B2 | 4/2015 | Chen et al. |
| 9,045,377 B2 | 6/2015 | Nicoleau et al. |
| 9,156,737 B2 | 10/2015 | Kraus et al. |
| 2002/0023594 A1 | 2/2002 | Kucera et al. |
| 2002/0129743 A1 | 9/2002 | Frailey et al. |
| 2002/0166479 A1 | 11/2002 | Jiang |
| 2004/0261664 A1 | 12/2004 | Oriakhi et al. |
| 2005/0003202 A1 | 1/2005 | Gerber |
| 2005/0009980 A1 | 1/2005 | Swedo et al. |
| 2005/0256226 A1 | 11/2005 | Thetford et al. |
| 2006/0249056 A1 | 11/2006 | Shiba et al. |
| 2007/0032550 A1 | 2/2007 | Lewis et al. |
| 2007/0163470 A1 | 7/2007 | Chanut et al. |
| 2008/0108732 A1 | 5/2008 | Wieland et al. |
| 2008/0200590 A1 | 8/2008 | Schinabeck et al. |
| 2008/0319217 A1 | 12/2008 | Ingrisch et al. |
| 2009/0054558 A1 | 2/2009 | Wieland et al. |
| 2009/0186964 A1 | 7/2009 | Schinabeck et al. |
| 2010/0004357 A1 | 1/2010 | Shiba et al. |
| 2010/0190888 A1 | 7/2010 | Gaeberlein et al. |
| 2011/0015301 A1 | 1/2011 | Herth et al. |
| 2011/0054053 A1 | 3/2011 | Lee et al. |
| 2011/0086974 A1 | 4/2011 | Kawata et al. |
| 2011/0160393 A1 | 6/2011 | Sakamoto et al. |
| 2011/0269875 A1 | 11/2011 | Nicoleau et al. |
| 2011/0281975 A1 | 11/2011 | Kraus et al. |
| 2012/0208932 A1 | 8/2012 | Kraus et al. |
| 2015/0080500 A1 | 3/2015 | Dierschke et al. |

FOREIGN PATENT DOCUMENTS

| | | |
|---|---|---|
| CH | 686186 A5 | 1/1996 |
| DE | 1593758 | 10/1970 |
| DE | 3527981 A1 | 2/1987 |
| DE | 4342407 A1 | 6/1995 |
| DE | 4411797 A1 | 10/1995 |
| EP | 0518156 A2 | 12/1992 |
| EP | 0605257 A1 | 7/1994 |
| EP | 0637574 A1 | 2/1995 |
| EP | 0780348 A1 | 6/1997 |
| EP | 0884291 A1 | 12/1998 |
| EP | 1110981 A2 | 6/2001 |
| EP | 1138697 A1 | 10/2001 |
| EP | 1142847 A2 | 10/2001 |
| EP | 1491516 A2 | 12/2004 |
| EP | 1655272 A1 | 5/2006 |
| EP | 2325231 A1 | 5/2011 |
| EP | 2886580 A1 | 6/2015 |
| GB | 1169582 | 11/1969 |
| JP | H0517784 A | 1/1993 |
| JP | 2000095554 A | 4/2000 |
| JP | 2001058863 A | 3/2001 |
| JP | 2008127247 A | 6/2008 |
| WO | WO 85/03699 | 8/1985 |
| WO | WO 01/38437 A1 | 5/2001 |
| WO | WO 02/070425 A1 | 9/2002 |
| WO | WO 03/072632 A1 | 9/2003 |
| WO | WO 2005/077857 A2 | 8/2005 |
| WO | WO 2006/002936 A1 | 1/2006 |
| WO | WO 2006/042709 A1 | 4/2006 |
| WO | WO 2006/072273 A1 | 7/2006 |
| WO | WO 2008/138277 A2 | 12/2006 |
| WO | WO 2007/071361 A1 | 6/2007 |
| WO | WO 2008/012438 A2 | 1/2008 |
| WO | WO 2008/052618 A1 | 5/2008 |
| WO | WO 2008/090424 A1 | 7/2008 |
| WO | WO-2009/103579 A1 | 8/2009 |
| WO | WO 2010/026155 A1 | 3/2010 |
| WO | WO 2010/040611 A1 | 4/2010 |
| WO | WO 2010/040612 A1 | 4/2010 |
| WO | WO 2011/006837 A1 | 1/2011 |
| WO | WO 2011/026625 A2 | 3/2011 |
| WO | WO 2011/026701 A1 | 3/2011 |
| WO | WO 2011/026720 A1 | 3/2011 |
| WO | WO-2015091461 A1 * | 6/2015 ............. C04B 28/04 |

OTHER PUBLICATIONS

Plank, et al., "Modification of the molar anionic charge density of acetone—formaldehyde—sulfite dispersant to improve adsorption behavior and effectiveness in the presence of CaAMPS®-co-NNDMA cement fluid loss polymer", Journal of Applied Polymer Science, vol. 111, Issue 4, Feb. 15, 2009, pp. 2018-2024.

Coelfen, Helmut, "Analytical Ultacentrifugation of NanoPanicles"; Polymer News; 2004; vol. 29; p. 101; Taylor & Francis.

Saito Fumio, et al., "Mechanical Synthesis of Hydrated Calcium Silicates by Room Temperature Grinding", Solid State Ionics; 1977; pp. 37-43; Elsevier.

"Silica"; Ullmann's Encyclopedia of Industrial Chemistry; 2002; Wiley-VCH Verlag GmbH & Co. KGaA; Abstract.

Biglova, R, et al., "Synthesis of New Stabilisers through Polymeranalogous Conversions", Oxidation Communications, Jan. 1, 1997, vol. 20, No. 1, pp. 139-144, XP009140808.

(56) References Cited

OTHER PUBLICATIONS

International Search Report in PCT/EP2016/081590, dated Mar. 14, 2017.
International Written Opinion in PCT/EP2016/051590, dated Mar. 14, 2017.

* cited by examiner

POLYCONDENSATE BASED WATER-REDUCER

CROSS REFERENCE TO RELATED APPLICATIONS

This application is a national stage application of International Application No. PCT/EP2016/081590, filed 16 Dec. 2016, which claims priority from European Patent Application No. 15200816.5, filed 17 Dec. 2015, which applications are incorporated herein by reference.

The present invention relates to polycondensates containing (I) at least a structural unit, which is an aromatic moiety bearing a polyether side chain comprising alkylene glycol units, with the proviso that the number of ethylene glycol units in the side chain is from 9 to 130 and that the content of ethylene glycol units is higher than 80 mol % with respect to all alkylene glycol units in the polyether side chain, (IIa) at least a structural unit, which is an aromatic moiety bearing at least one phosphoric acid monoester group and/or its salt, with the proviso that the molar ratio of (IIa):(I) is from 0.25 to 8, (IIb) at least a structural unit, which is an aromatic moiety with 6 carbon atoms, bearing at least one hydroxy group attached to the aromatic moiety with the proviso that the molar ratio of (IIa):(IIb) is from 0.2 to 1.9, (III) at least a methylene unit (—$CH_2$—), which is attached to two aromatic structural units Y, where aromatic structural units Y, independently of one another, are identical or different and are represented by structural unit (I), structural unit (IIa), structural unit (IIb) or optionally (IV) aromatic structural units of the polycondensate, which are different from structural unit (I), structural unit (IIa) and structural unit (IIb). The invention also concerns a process for the production of the polycondensates according to this invention, their use for the dispersion of inorganic binders, their use for increasing the strength development of concrete and their use for improving the slump-retention of concrete. The invention relates also to building material mixtures comprising one or more polycondensates according to this invention and one or more inorganic binders.

It is known that admixtures in the form of dispersants are added to aqueous slurries or pulverulent inorganic or organic substances, such as clays, silicate powder, chalk, carbon black, crushed rock and hydraulic binders, for improving their processability, i.e. kneadability, spreadability, sprayability, pumpability or flowability. Such admixtures are capable of preventing the formation of solid agglomerates and of dispersing the particles already present and those newly formed by hydration and in this way improving the workability. This effect is utilized in particular in a targeted manner in the preparation of building material mixtures which contain hydraulic binders, such as cement, lime, gypsum, hemihydrate or anhydrite.

In order to convert these building material mixtures based on said binders, into a ready-to-use, processible form, as a rule substantially more mixing water is required than would be necessary for the subsequent hydration or hardening process. The proportion of voids which is formed in the concrete body by the excess of water, subsequently evaporating water leads to significantly poorer mechanical strengths and resistance.

In order to reduce said excess proportion of water at a predetermined processing consistency (workability) and/or to improve the workability at a predetermined water/binder ratio, admixtures are used which are generally referred to as water-reducing agents or plasticizers. In practice copolymers obtained by radical copolymerization (also known as polycarboxylate ethers (PCE)) are used as such agents.

WO 2006/042709 A1 (also published as US 2008/0108732 A1) describes polycondensates based on an aromatic or heteroaromatic compound having 5 to 10 atoms or heteroatoms, having at least one oxyethylene or oxypropylene radical, and an aldehyde selected from the group consisting of formaldehyde, glyoxylic acid and benzaldehyde or mixtures thereof as plasticizer for inorganic binder compositions. As a catalyst for the polycondensation reaction strong mineral acids like for example sulfuric acid are used. In a particular embodiment, said polycondensates may also comprise phosphate polycondensates. In the examples B3 and B5 polycondensates of phenoxyethanol phosphate, ethoxylated phenol (the average number of ethylenoxide units attached is 20.5, respectively 43.3), phenol and formaldehyde are described. The molar ratio of ethoxylated phenol to phenoxyethanol phosphate to phenol is 1:2:0.5 in example B3 and 1:2:1 in example B5. WO 2006/042709 A1 mentions the use of phenol sulfonic acid as a possible monomer for the polycondensation reaction, but sulfuric acid is used as the acid catalyst for the polycondensation reaction. Phenol sulfonic acid is not mentioned as a possible catalyst for the polycondensation. Example B10 discloses for example a polycondensate made from 1 mol phenol, 1 mol phenol sulfonic acid and 2 mols of glyoxylic acid, 1 mol poly(ethylenoxyde)-monophenylether (1.000 g/mol), water and 1.5 mols of sulfuric acid.

WO2010/040611 A1 describes a process for the preparation of a phosphorylated polycondensate and the use thereof as an admixture in building material mixtures. The process is carried out by using alkylsulphonic acids and aromatic sulphonic acids as acid catalyst for the polycondensation reaction. It is possible to obtain products in the neutralized form, which have high solids contents without precipitation of inorganic salts. However the polycondensation catalysts (alkylsulphonic acids and aromatic sulphonic acids) are not incorporated into the polycondensates and remain in the resulting products, which is not desirable. WO2010/040611 A1 is also silent about the use of phenol sulfonic acids as an acid catalyst for the polycondensation reaction.

WO2010/040612 A1 relates to a phosphorylated polycondensate, a process for its production and the use as an admixture in a building material mixture. It was object to provide an economical dispersant for hydraulic binders, based on a phosphorylated polycondensate. The dispersant is particularly suitable as a plasticizer agent for concrete and can be prepared in a relatively simple manner. With respect to the production process it is regarded as essential that the polycondensation and the phosphorylation reaction of the phosphate monomer component can be carried out in one reaction mixture and at the same time. The phosphorylated aromatic monomer component formed in the reaction solution is neither purified nor isolated, but is used as monomer in the polycondensation reaction step.

US 2012/0208932 A1 describes polycondensation products and their preparation. The polycondensation products are based on (hetero)aromatics and aldehydes (preferably formaldehyde), said polycondensate having at least one structural unit having a polyisobutylene side chain attached to a (hetero)aromatic and at least one structural unit having ionizable groups attached to a (hetero)aromatic. The polyisobutylene side chains disclosed, comprise at least three isobutylene groups and together with the aromatic ring the molecular mass is therefore considerably higher than 200 g/mol. The solubility of the aromatics substituted with at least three isobutylene groups is close to insoluble, due to the strong hydrophobic effect of the polyisobutylene side chain. The polycondensates of US 2012/0208932 A1 are produced from the respective monomers in a melt process without a solvent, in particular without water. Emulsions are formed when adding water to the hydrophobic polymers obtained from the polycondensation process. The rather hydrophobic polymers of US 2012/0208932 A1 are used as an additive for hydraulic binders, in particular in order to improve the durability of concrete and in order to provide better corrosion protection properties to steel reinforced concrete structures. Both effects seem to be due to the hydrophobizing properties of the polymers, which reduce the transport of substances through the binder matrix.

The before mentioned prior art documents disclose polycondensates, which can be improved with respect to certain product properties, as for example their economic viability (in particular the batch time during production of the polycondensates and also the cost of the monomers used), dosage efficiency, slump-retention and strength development after 28 days. In particular the batch times during production of the polycondensates and the shelf life stability are improvable.

It is thus an object of the present invention to provide dispersants, especially for concrete, which provide a sufficient water reduction capacity at good economic viability (cost), having good shelf life stability against segregation of salts, having good slump-retention properties and achievement of good strength development after 28 days. In particular it is object of this invention to reduce the batch time in the production process of the polycondensates and to provide the polycondensates in a segregation stable form without salts from mineral acids or surfactants.

This object is achieved by a polycondensate containing
(I) at least a structural unit, which is an aromatic moiety bearing a polyether side chain comprising alkylene glycol units, with the proviso that the number of ethylene glycol units in the side chain is from 9 to 130 and that the content of ethylene glycol units is higher than 80 mol % with respect to all alkylene glycol units in the polyether side chain,
(IIa) at least a structural unit, which is an aromatic moiety bearing at least one phosphoric acid monoester group and/or its salt, with the proviso that the molar ratio of (IIa):(I) is from 0.25 to 8,
(IIb) at least a structural unit, which is an aromatic moiety with 6 carbon atoms, bearing at least one hydroxy group attached to the aromatic moiety with the proviso that the molar ratio of (IIa):(IIb) is from 0.2 to 1.9,
(III) at least a methylene unit (—$CH_2$—), which is attached to two aromatic structural units Y, where aromatic structural units Y, independently of one another, are identical or different and are represented by structural unit (I), structural unit (IIa), structural unit (IIb) or optionally (IV) aromatic structural units of the polycondensate, which are different from structural unit (I), structural unit (IIa) and structural unit (IIb).

The polycondensates according to this invention can be produced by polycondensation of aromatic monomers with formaldehyde. The aromatic monomers are converted into aromatic structural units (I), (IIa), (IIb) and optionally (IV) during the polycondensation reaction. Formaldehyde can also be used in the form of precursors, which are suitable to set free formaldehyde (in particular when in aqueous solution), as for example trioxan or para formaldehyde.

The polycondensates according to this invention are dispersants for inorganic binders, especially for cementitious mixtures like concrete or mortar.

Preferably the polycondensates are made in a polycondensation reaction in which monomers (M-I), (M-IIa), (M-IIb), (M-III), which is preferably formaldehyde and optionally monomer (M-IV) are used in order to introduce the respective structural units (I), (IIa), (IIb), (III), which is (—$CH_2$—) and optionally structural unit (IV). Preferably said structural units (I), (IIa), (IIb) and structural unit (IV) differ when compared with the respective monomers by the absence of two hydrogen atoms.

With respect to structural unit (I) it has been proven to be advantageous to have a minimum polyether side chain length for achieving a reasonable dispersion effect in cementitious binder systems, in particular in concrete. Very short side chains become economically less favourable, because the dispersibility of the admixtures is low and the necessary dosage for achieving a dispersion effect becomes high, whereas too long polyether side chains of the polycondensate result in less good rheological properties of the concrete (high plastic viscosity), prepared with these admixtures. The content of ethylene glycol units in the polyether side chain should be higher than 80 mol % with respect to all alkylene glycol units in the polyether side chain in order to allow sufficient solubility of the polycondensate products.

In the structural unit (I) the aromatic moiety bears one or more polyether side chains, preferably one polyether side chain. The structural units (I) are independently of one another identical or different. This means that one or several types of structural units (I) can be present in the polycondensate. For example the structural unit (I) can differ in the type of the polyether side chain and/or in the type of aromatic structure.

Structural unit (I) is derived from respective aromatic monomers which are aromatic monomers bearing a polyether side chain comprising alkylene glycol units and fulfilling the requirements with respect to the side chain length and the content of ethylene glycol in the side chain. Said monomers are incorporated into the polycondensate with the monomer formaldehyde and further monomers (M-IIa), (M-IIb) and optionally monomers (M-IV). In particular the structural unit (I) is different to the aromatic monomer from which it is derived by the absence of two hydrogen atoms, which are abstracted from the monomer during the polycondensation reaction (formation of water with one oxygen atom from the formaldehyde).

The aromatic moiety in structural unit (I) is preferably a substituted or not substituted aromatic moiety bearing a polyether side chain according to this invention. It is possible that one or more than one polyether side chain(s), are present in the structural unit (I), preferably one or two polyether side chain(s) are present, most preferably one polyether side chain. "Substituted aromatic moiety" in this context means preferably any substitution other than the polyether side chain or the polyether side chains according to this invention. Preferably the substitution is a C1 to C10 alkyl group, most preferably a methyl group. The aromatic moiety can preferably have 5 to 10 atoms in the aromatic ring, preferably 5 to 6 atoms in the aromatic ring; most preferably the aromatic structural unit has 6 C atoms in the aromatic ring. The aromatic moiety in structural unit (I) can be also a heteroaromatic structure, including atoms different from carbon like oxygen (in furfuryl alcohol), but preferably the atoms of the aromatic ring structure are carbon atoms, more preferably an aromatic ring with 6 carbon atoms.

Examples for the structural unit (I) are expressed in the following as the respective monomers. The structural unit (I), is different to the aromatic monomer from which it is derived by the absence of two hydrogen atoms, which are abstracted from the monomer during the polycondensation reaction.

For example, but not limited, in each case the according to this invention ethoxylated derivatives of the following aromatic alcohols and amines: phenol, cresol, resorcinol, catechol, hydroquinone, naphthol, furfuryl alcohol or aniline. Preferable is ethoxylated phenol. Resorcinol, catechol and hydroquinone bear preferably two polyether side chains. It is possible that resorcinol, catechol and hydroquinone bear also only one polyether side chain in each case. In each case it is possible that less than 20 mol % of alkylene glycol units are contained, which are not ethylene glycol units.

Preferable are polycondensates in which the molar mass of the structural unit (IIb) is lower than 200 g/mol, more preferably lower than 180 g/mol. Preferable are polycondensates in which the molar mass of the monomer (M-IIb) is lower than 202 g/mol, more preferably lower than 182 g/mol. The monomer (M-IIb) is transformed into the structural unit (IIb) during the polycondensation reaction.

The mass contribution of the structural units (IIb) in the case of a molecular weight higher than 200 g/mol to the polycondensates, becomes relatively high, but this additional mass would not especially add to the positive properties of the polycondensates as a dispersing agent for inorganic binders. In particular the dosage efficiency can be affected. This is in particular true if the monomers (IIb) are (besides being relatively large) hydrophobic, for example if major hydrophobic substituents are comprised with a substantial mass contribution. By the before standing limitation of the molar mass large in particular hydrophobic structural units with a molecular mass higher than 200 g/mol are excluded.

Preferable are polycondensates in which a monomer (M-IIb) is used for the introduction of the structural unit (IIb) in a polycondensation reaction leading to the polycondensate and the solubility of the monomer (M-IIb) in water is higher than 10 g/l at pH=4, 20° C. and atmospheric pressure.

Preferable are polycondensates in which the solubility in water of the polycondensate is higher than 300 g/l, more preferably higher than 450 g/l, the solubility of the polycondensate being measured at 20° C., atmospheric pressure and a pH of 4. Preferably the solubility in water of the polycondensates according to this invention in water is higher than 300 g/l and lower than 600 g/l. In each case the solubility in water is measured at 20° C., atmospheric pressure and a pH of 4.

Preferably the structural units (I) are represented by the following general formula

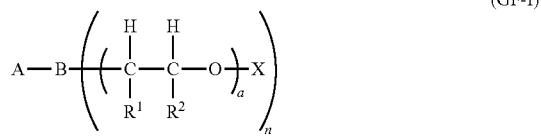

(GF-I)

where
A are identical or different and are represented by a substituted or unsubstituted aromatic or heteroaromatic compound having 5 to 10 atoms in the aromatic ring, preferably having 5 to 6 atoms in the aromatic ring, most preferably having 6 carbon atoms in the aromatic ring, where
B are identical or different and are represented by N, NH or O
where
n=2 if B=N and n=1 if B=NH or O, preferably B=O,
where
$R^1$ and $R^2$, independently of one another, are identical or different and are represented by a branched or straight-chain $C_1$- to $C_{10}$-alkyl radical, $C_5$- to $C_8$-cycloalkyl radical, aryl radical, heteroaryl radical or H, preferably H, with the proviso that the content of ethylene glycol units is higher than 80 mol % with respect to all alkylene glycol units in the polyether side chain, where
a are identical or different and are represented by an integer from 9 to 130, preferably 20 to 130, more preferably 50 to 130, most preferably 9 to 50,
where
X are identical or different and are represented by a branched or straight-chain $C_1$- to $C_{10}$-alkyl radical, $C_5$- to $C_8$-cycloalkyl radical, aryl radical, heteroaryl radical or H, preferably H.

$R^1$ and $R^2$ are independently of one another, identical or different and are preferably represented by H, methyl, ethyl or phenyl, particularly preferably by H or methyl and especially preferably both $R^1$ and $R^2$ are H, with the proviso that the content of ethylene glycol units is higher than 80 mol % with respect to all alkylene glycol units in the polyether side chain.

The structural units (I) possess a relatively long hydrophilic polyether side chain, which additionally creates a steric repulsion between the on the surface of the cement particles adsorbed polycondensates. The dispersing effect for inorganic binders is improved.

The structural unit (IIa) provides anionic groups in the polycondensate (phosphoric acid monoester in its acid or salt form), which interfere with the positive charge present on the surface of cement particles in an aqueous cementitious dispersion, which is strongly alkaline. Due to the electrostatic attraction the polycondensates adsorb on the surface of the cement particles and the cement particles are dispersed.

The term phosphoric acid monoester in this specification means preferably the monoester of phosphoric acid with one equivalent of an alcohol comprising an aromatic moiety, more preferably according to the following general formula: $PO(OH)_2(OR)_1$,
wherein H can be replaced by a cation equivalent and R is the rest of the alcohol comprising an aromatic moiety from which the hydroxy group is deducted.

In the structural unit (IIa) the aromatic moiety bears preferably one phosphoric acid monoester group and/or its salt. This means that a monoalcohol with only one hydroxy group is preferably used as the alcohol educt to be phosphorylated. The structural unit (IIa) can also bear more than one phosphoric acid monoester group and/or its salt, preferably two. In this case at least a dialcohol (alcohol with two hydroxy functions) is used or a polyalcohol. The structural units (IIa) are independently of one another identical or different. This means that one or several types of structural units (IIa) can be present in the polycondensate.

Structural unit (IIa) in the polycondensate is an aromatic moiety bearing at least one phosphoric acid monoester group and/or its salt, with the proviso that the molar ratio of (IIa):(I) is from 0.25 to 8.0, preferably 0.3 to 6.0, more preferably 0.45 to 4.0, most preferably 0.45 to 3.0. This ratio is advantageous, because a sufficient initial dispersibility (relatively high content of structural unit (IIa)) and a sufficient slump-retention property (relatively high content of structural unit (I)) of the polycondensates in the concrete experiment can be achieved.

As was explained before for structural unit (I), also the structural unit (IIa) is different to the aromatic monomer from which it is derived by the absence of two hydrogen atoms, which are abstracted from the monomer during the polycondensation reaction.

The aromatic moiety in structural unit (IIa) is preferably a substituted or not substituted aromatic moiety bearing at least one phosphoric acid monoester group and/or its salt. It is possible that one or more than one phosphoric acid monoester group(s) and/or its salt are present in the structural unit (IIa), preferably one or two phosphoric acid monoester group(s) and/or its salt are present, most preferably one phosphoric acid monoester group and/or its salt. The aromatic moiety of structural unit (IIa) has preferably 5 to 10 atoms in the aromatic ring, preferably 5 to 6 atoms in the aromatic ring, most preferably the aromatic structural unit has 6 C atoms. The aromatic moiety in structural unit (IIa) can also be a heteroaromatic structure, including atoms different from carbon like oxygen (in furfuryl alcohol), but preferably the atoms in the aromatic ring structure are carbon atoms.

Preferably the structural unit (IIa) is represented by the following general formula (GF-IIa):

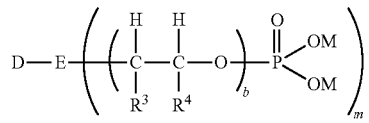

where
D are identical or different and are represented by a substituted or unsubstituted aromatic or heteroaromatic compound having 5 to 10 atoms in the aromatic ring, preferably having 5 to 10 atoms in the aromatic ring, more preferably having 5 to 6 atoms in the aromatic ring, most preferably having 6 carbon atoms in the aromatic ring,
where
E are identical or different and are represented by N, NH or O, preferably E is represented by O,
where
m=2 if E=N and m=1 if E=NH or O
where
$R^3$ and $R^4$, independently of one another, are identical or different and are represented by a branched or straight-chain $C_1$- to $C_{10}$-alkyl radical, $C_5$- to $C_8$-cycloalkyl radical, aryl radical, heteroaryl radical or H, preferably H, more preferably $R^3$ and $R^4$ are both H,
where
b are identical or different and are represented by an integer from 1 to 20, preferably 1 to 4, more preferably 1,
where M independently of one another is identical or different and is H or a cation equivalent.

The term cation equivalent means any metal cation or optionally substituted ammonium cation, which is able to replace the proton with the proviso that the molecules are electrically neutral (here structural unit (IIa)). Therefore for example in the case of an earth alkali metal with two positive charges there must be a factor of ½ in order to assure neutrality (½ earth alkali metal), in the case of $Al^{3+}$ as the metal component M would have to be ⅓ Al. Mixed cation equivalents with for example two or more types of metal cations are also possible. Preferably M is $NH_4$, an alkali metal or ½ earth alkali metal.

The phosphoric acid monoesters of general formula (GF-IIa) can be an acid with two acid protons (M=H). The phosphoric acid monoesters can be also present in their deprotonated form in which case the proton is replaced by a cation equivalent. The phosphoric acid monoesters can also be partially deprotonated. The term cation equivalent was already explained in the before standing text. Preferably M is $NH_4$, an alkali metal or ½ earth alkali metal.

In general formula (IIa) E is preferably O (oxygen).

Examples for the structural unit (IIa) are derived from the respective phosphorylated aromatic alcohol monomers and differ by the abstraction of two hydrogen atoms from the respective monomer during the polycondensation reaction. For example, but not limited, structural units (IIa) are derived from the phosphorylation products of the following list of alcohols, respectively hydroquinones, in brackets the respective phosphorylated monomer (phosphoric acid monoester with the alcohol) is indicated, which is deemed to be the main product of the phosphorylation reaction: phenoxyethanol (phenoxyethanol phosphate), phenoxydiglycol, (phenoxydiglycol phosphate) (methoxyphenoxy)ethanol ((methoxyphenoxy)ethanol phosphate), methylphenoxyethanol, (methylphenoxyethanol phosphate), bis(β-hydroxyethyl) hydroquinone ether, (bis(β-hydroxyethyl) hydroquinone ether phosphate and bis(β-hydroxyethyl) hydroquinone ether diphosphate) and nonylphenol (nonylphenol phosphate). More preferable are phenoxyethanol phosphate, phenoxydiglycol phosphate and bis(β-hydroxyethyl) hydroquinone ether diphosphate. Most preferable is phenoxyethanol phosphate. It is possible to use mixtures of the before mentioned monomers from which the structural units (IIa) are derived.

It should be mentioned that typically during the phosphorylation reaction (e.g. reaction of the before mentioned aromatic alcohol(s) including hydroquinones with polyphosphoric acid) besides the before mentioned main products (monoester of phosphoric acid with one equivalent of aromatic alcohol ($PO(OH)_2(OR)_1$) also side products can be formed. Said side products are in particular the diesters of phosphoric acid with two equivalents of the aromatic alcohol ($PO(OH)(OR)_2$) or the respective triesters ($PO(OR)_3$). The formation of triesters requires temperatures above 150° C. and is therefore usually not observed. R stands here for the aromatic alcohol structure without the OH group. It is possible that to some extent unreacted alcohol is present in the reaction mixture, the content is usually low. The main product (monoester) after the phosphorylation reaction is typically present in the reaction mixture at a level of higher than 95 weight % with respect to the three possible types of esters (mono-, di-, and triester).

The groups A and D of the structural units (I) and (IIa) are represented by for example (not limited) phenyl, 2-methylphenyl, 3-methylphenyl, 4-methylphenyl, 2-methoxyphenyl, 3-methoxyphenyl, 4-methoxyphenyl, preferably phenyl, it is possible for A and D to be chosen independently of one another. Several types of A can be present in the polycondensate and several types of D can also be present in the polycondensate. The groups B and E, independently of one another, are preferably represented by O (oxygen).

The radicals $R^3$ and $R^4$ in general formula (GF-IIa) can be chosen independently of one another and are preferably represented by H, methyl, ethyl or phenyl, particularly preferably by H or methyl and especially preferably by H.

The structural unit (IIb) is at least a structural unit, which is an aromatic moiety bearing at least one hydroxy group attached to the aromatic moiety. The molar ratio of (IIa): (IIb) is from 0.2 to 1.9, preferably 0.25 to 1.5, more preferably 0.3 to 1.4, most preferably 0.3 to 1.2.

Preferably the structural units (IIb) are represented by the general formula (GF-IIb)

F—OH where
F is represented by an aromatic moiety with 6 C atoms in the aromatic ring. F is substituted by at least one hydroxy group according to the formula (GF-IIb), it can be also be substituted by more than one hydroxy group. In particular F is preferably not substituted by phosphoric acid monoesters and/or their salts and also not by polyether side chains comprising alkylene glycol units. Preferably F is —[C$_6$H$_3$]— or F is —[C$_6$H$_2$—(OH)]— or F is —[C$_6$H—(OH)$_2$]— Most preferably F is —[C$_6$H$_3$]—.

The structural unit (IIb) is preferably introduced into the polycondensates by cocondensation of phenols and/or phenol sulfonic acids. It has been found that in particular 2-hydroxy phenol sulfonic acid is useful as a strongly acid monomer for the acid catalysis of the polycondensation. In this way it is possible to avoid the use of sulfuric acid, however mixtures of sulfuric acid and phenol sulfonic acid can also be used. Surprisingly when using phenol sulfonic acid as an acid catalyst and monomer for the polycondensation, it was found that sulfur was not incorporated into the polymers. It seems that phenol sulfonic acid decomposes to sulfuric acid and phenol in a hydrolysis reaction with water, which is usually present in the reaction systems (at least in traces). Phenol is then present in the polycondensates in its polycondensated form incorporated into the copolymer. More details about the monomers, which can be used as the monomer (IIa) can be found later in this text when the process of producing the polycondensates is explained more in detail.

The aromatic structural units (I), (IIa), (IIb) and also the optional aromatic structural unit (IV) differ from the respective monomers from which they are derived by the loss of two hydrogen atoms during the polycondensation reaction. In other words, two hydrogen atoms attached to the aromatic radical are replaced by chemicals bonds, which form the backbone of the polycondensate. In particular, (the aromatic radicals comprising) groups A, D and F in the general formulae of the structural units (I), (IIa) and (IIb) differ from the respective monomers from which they are derived by the loss of two hydrogen atoms during the polycondensation reaction.

The structural unit (III) is at least a methylene unit (—CH$_2$—),—which is attached to two aromatic structural units Y, where aromatic structural units Y, independently of one another, are identical or different and are represented by structural unit (I), structural unit (IIa), structural unit (IIb) or optionally (IV) aromatic structural units of the polycondensate, which are different from structural unit (I), structural unit (IIa) and structural unit (IIb). The methylene unit is introduced by the reaction of formaldehyde under formation of water during the polycondensation. Preferably more than one methylene unit is contained in the polycondensate. The structural (III) is methylene (—CH$_2$—)—and is derived from the monomer formaldehyde during the polycondensation reaction.

The aromatic structural units of the polycondensate (IV) are optional. It can be any aromatic structural unit, which is different from the structural units (I), structural units (IIa) and structural units (IIb). For example, the structural unit (IV) can be derived from any aromatic monomer (abstraction of two hydrogen atoms), which is able to react in a polycondensation reaction with formaldehyde, like for example but not limited to: phenoxyethanol, anisole, 1-methoxynaphthalin, 2-methoxynaphthalin or furan. It is also possible to use mixtures of the before standing monomers.

Preferable are polycondensates in which the structural units (I), (IIa) and (IIb) are represented by the following general formulae

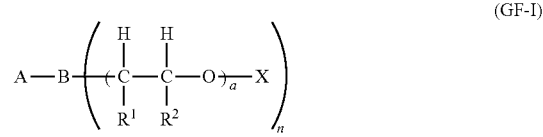

(GF-I)

where
A are identical or different and are represented by a substituted or unsubstituted aromatic or heteroaromatic compound having 5 to 10 atoms in the aromatic ring, preferably having 5 to 6 atoms in the aromatic ring, most preferably having 6 carbon atoms in the aromatic ring,
where
B are identical or different and are represented by N, NH or O
where
n=2 if B=N and n=1 if B=NH or O, preferably B=O,
where
R$^1$ and R$^2$, independently of one another, are identical or different and are represented by a branched or straight-chain C$_1$- to C$_{10}$-alkyl radical, C$_5$- to C$_8$-cycloalkyl radical, aryl radical, heteroaryl radical or H, preferably H, with the proviso that the content of ethylene glycol units is higher than 80 mol % with respect to all alkylene glycol units in the polyether side chain, where
a are identical or different and are represented by an integer from 9 to 130, preferably 20 to 130, more preferably 50 to 130, most preferably 9 to 50,
where
X are identical or different and are represented by a branched or straight-chain C$_1$- to C$_{10}$-alkyl radical, C$_5$- to C$_8$-cycloalkyl radical, aryl radical, heteroaryl radical or H, preferably H,

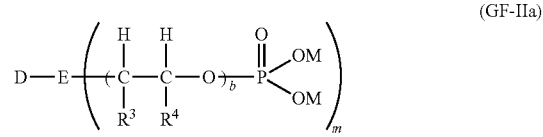

(GF-IIa)

where
D are identical or different and are represented by a substituted or unsubstituted aromatic or heteroaromatic compound having 5 to 10 atoms in the aromatic ring, preferably having 5 to 10 atoms in the aromatic ring, more preferably having 5 to 6 atoms in the aromatic ring, most preferably having 6 carbon atoms in the aromatic ring,
where
E are identical or different and are represented by N, NH or O, preferably E is represented by O, where
m=2 if E=N and m=1 if E=NH or O
where
$R^3$ and $R^4$, independently of one another, are identical or different and are represented by a branched or straight-chain $C_1$- to $C_{10}$-alkyl radical, $C_5$- to $C_8$-cycloalkyl radical, aryl radical, heteroaryl radical or H, preferably H, more preferably $R^3$ and $R^4$ are both H,
where
b are identical or different and are represented by an integer from 1 to 20, preferably 1 to 4, more preferably 1,
where M independently of one another is identical or different and is H or a cation equivalent, F—OH  (GF-IIb)

where
F is represented by an aromatic moiety with 6 C atoms in the aromatic ring. F is substituted by at least one hydroxy group according to the formula (GF-IIb), it can be also be substituted by more than one hydroxy group. In particular F is preferably not substituted by phosphoric acid monoesters and/or their salts and also not by polyether side chains comprising alkylene glycol units. Preferably F is —[$C_6H_3$]— or F is —[$C_6H_2$—(OH)]— or F is —[$C_6H$—(OH)$_2$]— Most preferably F is —[$C_6H_3$]—.

Preferable are polycondensates in which the weight average molecular weight ($M_w$) of the polycondensate is from 8,000 g/mol to 70,000 g/mol (preferably 9,500 g/mol to 40,000 g/mol). $M_w$ is the average molecular weight of the polycondensate as determined by GPC:

Column combination: OH-Pak SB-G, OH-Pak SB 804 HQ and OH-Pak SB 802.5 HQ by Shodex, Japan; eluent: 80 Vol.-% aqueous solution of $HCO_2NH_4$ (0.05 mol/l) and 20 Vol.-% acetonitrile; injection volume 100 μl; flow rate 0.5 ml/min. The molecular weight calibration was performed with poly(styrene sulfonate) standards for the UV detector and poly(ethylene oxide) standards for the RI detector. Both standards were purchased from PSS Polymer Standards Service, Germany. In order to determine the molecular weight of the polymers, the UV-detection at 254 nm wavelength was used, because the UV detector is only responsive towards the aromatic compounds and neglects inorganic impurities, that otherwise could falsify the results for the molecular weights.

Preferable are polycondensates in which the structural unit (I) is derived from an alkoxylated, preferably ethoxylated, aromatic alcohol monomer bearing a hydroxyl group at the end of the polyether side chain.

Preferable are polycondensates in which the structural unit (I) is a phenyl poly alkylene glycol. Phenyl poly alkylene glycols are relatively easy to obtain and economically viable, also the reactivity of the aromatic compound is rather good.

Preferably the structural unit (I) is a phenyl poly alkylene glycol according to the formula —[$C_6H_3$—O-(AO)$_n$—H]—.

n is an integer from 9 to 130, preferably from 20 to 130, more preferably from 50 to 130, most preferably 9 to 50. A is an alkylene with 2 to 5 carbon atoms, preferably 2 to 3 carbon atoms, with the proviso that the content of ethylene glycol units (A=ethylene) is higher than 80 mol %, preferably higher than 85 mol %, more preferably higher than 90 mol %, most preferably higher than 95 mol %, with respect to all alkylene glycol units in the polyether side chain (AO)$_n$.

The substitution pattern on the aromatic benzene unit $C_6H_3$ (in the above formula) is due to the activating effect (electron donating effect) of the oxygen atom attached to the benzene ring mainly in the ortho (2-position) and para substitution (4-position) with respect to the position of said oxygen atom attached to the benzene ring (1-position). The meta position is less preferred.

Preferable are polycondensates in which the structural unit (IIa) is derived from an aromatic alcohol monomer, which was in a first step alkoxylated, preferably ethoxylated and the obtained alkoxylated, preferably ethoxylated, aromatic alcohol monomer bearing a hydroxyl group at the end of the polyether side chain was in a second step phosphorylated to the phosphoric acid monoester group.

Preferable are polycondensates in which the structural unit (IIa) is an alkoxylated, preferably ethoxylated, hydroquinone phosphoric acid monoester according to the following general formula (GF-V)

-[[$M_2O_3P$-(AO)$_p$]—O—$C_6H_2$—O-[(AO)$_p$—$PO_3M_2$]]-,  (GF-V)

p is an integer from 1 to 20, preferably 1 to 4, most preferably 1, A is an alkylene with 2 to 5, preferably 2 to 3 carbon atoms, M independently of one another is identical or different and is H or a cation equivalent. In order to avoid misunderstandings, it is reconfirmed that the general formula (GF-V) is a subspecies of the structural units (IIa).

The esters of general formula (GF-V) can be an acid with two acid protons (M=H). The esters can be also present in their deprotonated form in which case the proton is replaced by a cation equivalent. The esters can also be partially deprotonated. The term cation equivalent means any metal cation or optionally substituted ammonium cation, which is able to replace the proton with the proviso that the molecules are electrically neutral. Therefore, for example in the case of an earth alkali metal with two positive charges there must be a factor of ½ in order to assure neutrality (½ earth alkali metal), in the case of $Al^{3+}$ as the metal component M would have to be ⅓ Al. Mixed cation equivalents with for example two or more types of metal cations are also possible.

Preferably M is N Ha, an alkali metal or ½ earth alkali metal.

Alkoxylated, preferably ethoxylated, hydroquinone phosphoric acid monoesters are relatively easy to obtain and economically viable, also the reactivity of the aromatic compounds in the polycondensation reaction is rather good.

Preferable are polycondensates in which the molar ratio of the sum of structural units (I), (IIa) and (IIb) to the structural unit(s) (IV) is higher than 1/1, preferably higher than 2/1. Most preferably no structural unit (IV) is contained in the polycondensate.

It is preferable that the proportion of optional structural units (IV), which are different from structural units (I), (IIa) and (IIb), is not too high in order to achieve sufficient dispersibility and good rheological properties of the concrete made with the polycondensates according to this invention. This means in other words that preferably more than half of the aromatic structural units are in sum of the structural unit (I), (IIa) and (IIb) type. In each case several types of structural units (I), (IIa) or (IIb) can be present in the polycondensate. The optional structural units (IV), depending on their type, may not contribute very strongly to the dispersibility of the polycondensate in concrete, but the backbone length of the polycondensate becomes longer, therefore the content of structural units (IV) is preferably limited.

Preferable are polycondensates in which the molar ratio of the sum of structural units (I), (IIa) and (IIb) to the structural units (III) is from 0.8/1 to 1/0.8.

Preferable are polycondensates, where in (I) the number of ethylene glycol units in the side chain is from 9 to 50, preferably 9 to 41, more preferably from 9 to 35, most preferably from 12 to 23 and the content of ethylene glycol units is higher than 80 mol % with respect to all alkylene glycol units in the polyether side chain, and wherein the polycondensation degree of the polycondensate containing the units (I), (IIa), (IIb) and optionally (IV) is in the range from 10 to 75.

It has been found that relatively short polyether side chain lengths, in particular in a combination with a certain range of polycondensation degree (PD) contribute to the good rheological behaviour of concrete prepared with the polycondensates according to this invention. In particular low plastic viscosities of the concrete produced with the polycondensates of this kind can be obtained. Too short side chains become less economically interesting, as the dispersion effect decreases and the dosage needed for obtaining a certain level of workability (e.g. slump in the concrete test) increases.

The polycondensation degree (PD) of the polycondensates is determined by the kind and average number of structural units (I), (IIa), (IIb), (III) and optionally (IV). The PD describes the length of the polymer backbone of the polycondensate, as it gives a value of the number of repeating units contained in the polycondensate. Details of the polycondensation degree are explained in the following text.

In contrast to the polycondensation degree, the average molecular weight $M_w$ of a polymer (usually determined by GPC measurement relative to a standard) does not consider the backbone length in particular, as the $M_w$ value reflects only the number and masses of each monomer contained in the polymer. For a given value $M_w$ the backbone length of the polymer can be long, if the mass of the monomers is low. On the other side the backbone length of a polymer can be short, even if $M_w$ is relatively high (high masses of the monomers). In particular, a high $M_w$ value is not absolutely an indicator for a long backbone length of the polycondensate or a polymer in general. The average molecular weight $M_w$ allows only a conclusion to the backbone length for a given set of structural units (monomers).

It was found that polycondensates with relatively short, but not too short polyether side chains and a polycondensation degree in the range from 10 to 75 are especially effective dispersants for cementitious compositions and are in particular effective in improving the rheology of fresh concrete. Especially the viscosity of the concrete can be effectively reduced.

The polycondensation degree of the polycondensates containing the structural units (I), (IIa), (IIb), (III) and optionally (IV) will be abbreviated for reasons of convenience as PD. The PD is calculated from the $M_w$ of the polycondensate and the analytically known ratios of the units (I) (IIa), (IIb), (III) and optionally (IV) in the polycondensate according to the following formula:

$$PD=M_w/[(\Sigma_i(n_i \cdot M_i))/(\Sigma_i n_i)]$$

PD=$M_w$/[average molecular weight of all structural units in the polycondensate]

$M_w$ is the weight average molecular weight of the polycondensate as determined by GPC:

Column combination: OH-Pak SB-G, OH-Pak SB 804 HQ and OH-Pak SB 802.5 HQ by Shodex, Japan; eluent: 80 Vol.-% aqueous solution of $HCO_2NH_4$ (0.05 mol/l) and 20 Vol.-% acetonitrile; injection volume 100 µl; flow rate 0.5 ml/min. The molecular weight calibration was performed with poly(styrene sulfonate) standards for the UV detector and poly(ethylene oxide) standards for the RI detector. Both standards were purchased from PSS Polymer Standards Service, Germany. In order to determine the molecular weight of the polymers, the UV-detection at 254 nm wavelength was used, because the UV detector is only responsive towards the aromatic compounds and neglects inorganic impurities, that otherwise could falsify the results for the molecular weights.

$n_i$ is the number in mol of the structural units (I), (IIa), (IIb), (III) and optionally (IV). The index i is an abbreviation of (I), (IIa), (IIb), (III) and optionally (IV). It is possible that various kinds of structural units (I), for example two or more types of structural unit (I) are present in the polycondensate. The same is true for the structural units (IIa), (IIb) and optionally (IV), whereas structural unit (III) is defined as a methylene group.

$M_i$ is the mass of structural units (I), (IIa), (IIb), (III) and optionally (IV). The structural units (I), (IIa), (IIb), (III) and optionally (IV) are introduced into the polycondensation product by a polycondensation reaction of formaldehyde with the aromatic monomers leading to structural units (I), (IIa), (IIb), (III) and optionally (IV). In this well-known polycondensation reaction between the monomer formaldehyde and the aromatic monomers, water is formed and the formaldehyde is inserted between the aromatic units in the form of the structural unit methylene. Two hydrogen atoms are released from the respective aromatic monomers and form together with the oxygen from the monomer formaldehyde the water.

Therefore the mass of the aromatic structural units (I), (IIa), (IIb) and optionally (IV) is the mass of the respective aromatic monomer used, minus 2 g/mol for the loss of 2 H atoms abstracted from the monomer during the polycondensation reaction. The mass of the methylene unit —$CH_2$— (structural unit (III)) is 14 g/mol.

For the calculation of the polycondensation degree (PD) the respective product of mol number $n_i$ and mass of the respective structural unit $M_i(\Sigma_i(n_i \cdot M_i))$ has to be calculated. This is possible from respective analytical results of the polycondensate. It is defined for the calculation that the sum of the mol numbers of all aromatic units (I), (IIa), (IIb) and optionally (IV) gives the mol number of structural unit (III). This is due to the fact that in between the aromatic units one methylene group is introduced. It should also be mentioned that in the case that for example more than one type of structural unit (I) is present in the polycondensate, it will be necessary to build the sum of $(\Sigma_i(n_i \cdot M_i))$ for each type of structural unit (I). The same is true for structural units (II) and optionally structural units (IV) in an analogous way.

The mathematical term $[(\Sigma_i(n_i \cdot M_i))/(\Sigma_i n_i)]$ is furthermore an indication of the average molecular weight of all the structural units (in particular (I), (IIa), (IIb), (III) and optionally (IV)) contained in the polycondensate. Said value depends in particular from the mol numbers of each monomer and their respective mass. In this context it should be kept in mind that for the calculation of the molecular mass of structural units (IIa), respectively from the monomers (IIa), the acid form of the phosphoric acid monoester has to be considered and not its salt form. For example in the case of the monomer phenoxyethanol phosphate, which is the product of esterification between 1 mol of phosphoric acid and 1 mol of phenoxyethanol ($C_8H_{11}O_5P$) the mass is 218 g/mol, even if actually the sodium salt ($C_8H_9Na_2O_5P$) might have been used, which would have a higher molecular weight. The same calculation is also to be used for optional structural units (IV), which can form a salt due to the presence of acidic functional groups (e.g. phenol in the form of its phenolate salt), also for phosphoric acid diesters if present.

With respect to (IIb) its mass is calculated as —[$C_6H_3$—O—H]—, which results in 92.1 g/mol.

The division of $M_w$ with said value [$(\Sigma_i(n_i \cdot M_i))/(\Sigma_i n_i)$], which is the average molecular weight of all the structural units, gives an average value of the number of repeating units contained in the polycondensate (=polycondensation degree (PD)). This value is a measure and characteristic for the length of the backbone of the polycondensate.

As examples for the calculation of the PD value the examples 2, 3 and 5 from the experimental part are given (for the monomer composition and GPC details, please compare table 1 and 2 in the experimental part):

EXAMPLE 2

The molar ratio of structural units of the general formula (I) to general formula (IIa) to general formula (IIb) is 1:2:1.52. The molecular weight of the structural unit (I) is 1,998 g/mol. The molecular weight of (IIa) is 216 g/mol, the molecular weight of (IIb) is 92.1 g/mol and the weight average molecular weight of the polycondensate $M_w$ is 17,020 g/mol (by GPC). It is noted that phenol sulfonic acid hydrolyses to phenol, which is then incorporated into the copolymer, therefore the molecular weight of phenol is considered as —[$C_6H_3$—O—H]—, which results in 92.1 g/mol.

The mol number of methylene groups from formaldehyde is equal to the sum of the mol numbers of all aromatic structural units (I), (IIa) and (IIb). A structural unit (IV) is not present.

$$PD = M_w / [(\Sigma_i(n_i \cdot M_i))/(\Sigma_i n_i)]$$

In this case the PD value is 58.4=17,020 g/mol/[(1 mol·1,998 g/mol+2 mol·216 g/mol+1.52·92.1 g/mol+4.52·14 g/mol)/(1 mol+2 mol+1.52 mol+4.52 mol)].

EXAMPLE 3

The molar ratio of structural units of the general formula (I) to general formula (IIa) to general formula (IIb) is 1:2:1.52. The molecular weight of the structural unit (I) is 1,998 g/mol. The molecular weight of (IIa) is 216 g/mol, the molecular weight of (IIb) is 92.1 g/mol (phenol was used) and the weight average molecular weight $M_w$ of the polycondensate is 19,660 g/mol (by GPC).

The mol number of methylene groups from formaldehyde is equal to the sum of the mol numbers of all aromatic structural units (I), (IIa) and (IIb). A structural unit (IV) is not present.

$$PD = M_w / [(\Sigma_i(n_i \cdot M_i))/(\Sigma_i n_i)]$$

In this case the PD value is 67.5=19,660 g/mol/[(1 mol·1,998 g/mol+2 mol·216 g/mol+1.52 mol·92.1 g/mol+4.52·14 g/mol)/(1 mol+2 mol+1.52 mol+4.52 mol)].

EXAMPLE 5

The molar ratio of structural units of the general formula (I) to general formula (IIa) to general formula (IIb) is 1:0.6:0.6. The molecular weight of the structural unit (I) is 748 g/mol. The molecular weight of (IIa) is 216 g/mol, the molecular weight of (IIb) is 92.1 g/mol (phenol sulfonic acid, which hydrolyses, was used) and the weight average molecular weight $M_w$ of the polycondensate is 9,860 g/mol (by GPC).

The mol number of methylene groups from formaldehyde is equal to the sum of the mol numbers of all aromatic structural units (I), (IIa) and (IIb). A structural unit (IV) is not present.

$$PD = M_w / [(\Sigma_i(n_i \cdot M_i))/(\Sigma_i n_i)]$$

In this case the PD value is 45=9,860 g/mol/[(1 mol·748 g/mol+0.6 mol·216 g/mol+0.6 mol·92.1 g/mol+2.2·14 g/mol)/(1 mol+0.6 mol+0.6 mol+2.2 mol)].

The PD is a number without units and due to the fact that it is an average value, it can be also a broken number. Therefore it could be also called a value for the average of an assembly of polymers with the average molecular weight $M_w$. Of course when looking at one specific polycondensate structure, only integral numbers are possible for the number of repeating units, because a broken number of monomers in a single polymer is not possible.

Chemically, the PD value is an indicator of how many units (I), (IIa), (IIb), (III) and optionally (IV) are present in the polycondensate on average. In particular the PD value indicates the backbone length of the polycondensate.

It has been found that shorter polyether side chain lengths contribute to the good rheological behaviour of concrete prepared with the polycondensates according to this invention. In particular low plastic viscosities of the concrete produced with the polycondensates can be obtained. Too short side chains become less economically interesting, as the dispersion effect decreases and the dosage needed for obtaining a certain level of workability (e.g. slump in the concrete test) increases.

Preferable are polycondensates according to this invention in a formulation together with further dispersants selected from the group of a) sulfonated melamine-formaldehyde condensates, b) lignosulfonates, c) sulfonated ketone-formaldehyde condensates, d) sulfonated naphthalene-formaldehyde condensates (BNS), e) polycarboxylate ethers (PCE), f) non-ionic copolymers for extending workability to a cementitious mixture containing hydraulic cement and water, wherein the copolymer comprises residues of at least the following monomers: Component A comprising an ethylenically unsaturated carboxylic acid ester monomer comprising a moiety hydrolysable in the cementitious mixture, wherein the hydrolysed monomer residue comprises an active binding site for a component of the cementitious mixture; and Component B comprising an ethylenically unsaturated, carboxylic acid ester or alkenyl ether monomer comprising at least one $C_{2-4}$ oxyalkylene side group of 1 to 350 units or g) phosphonate containing dispersants according to the following formula

whereby
R is H or a saturated or unsaturated hydrocarbon rest, preferably a C1 to C15 alkyl radical,
A is the same or different and independently from each other an alkylene with two to 18 carbon atoms, preferably ethylene and/or propylene, most preferably ethylene,
n is an integer from 5 to 500, preferably 10 to 200, most preferably 10 to 100 and
M is H, an alkali metal, ½ earth alkali metal and/or an amine and whereby any combination of the before standing further dispersants a) to g) is possible.

The polycondensates according to this invention are dispersants for inorganic binders, especially for cementitious mixtures like concrete or mortar. It is possible to use the polycondensates according to this invention also in a formulation with further dispersants for inorganic binders, preferably dispersants a) to g) as mentioned in the before standing text.

When the polycondensates according to this invention are present in a formulation together with further dispersants, preferably with at least one of the dispersants a) to g), it is preferable that the weight ratio, in terms of solid content, of the polycondensates according to this invention to the sum of the weights of at least one of the further dispersants is preferably higher than ¼, more preferably higher than ⅓, most preferably higher than ⅔.

The dosage of the sum of the polycondensates according to this invention and the further dispersant(s) in weight % of cement is from 0.1 to 2%, preferably 0.2 to 1%.

urea. Moreover, further aromatic units as well may be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid, for example.

The b) lignosulfonates, which can be used as dispersant together with the polycondensates according to this invention in a formulation, are products which are obtained as by-products in the paper industry. They are described in Ullmann's Encyclopedia of Industrial Chemistry, 5$^{th}$ Ed., vol. A8, pages 586, 587. They include units of the highly simplified and idealizing formula

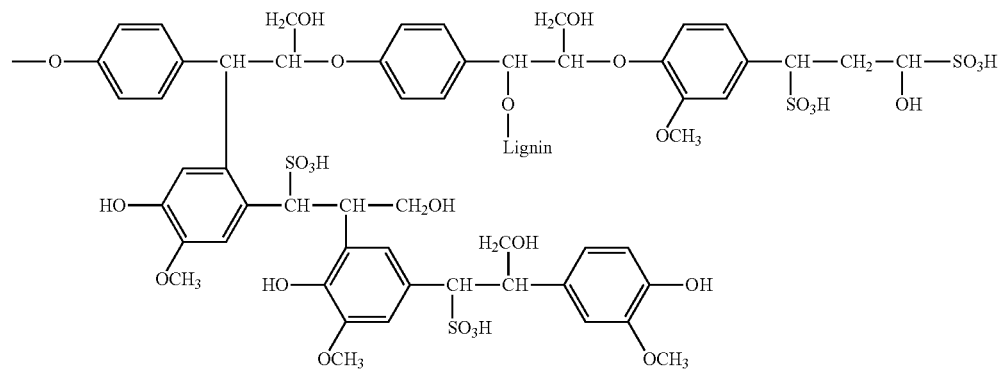

The a) sulfonated melamine-formaldehyde condensates, which can be used as dispersant in a formulation with the polycondensates according to this invention are of the kind frequently used as plasticizers for hydraulic binders (also referred to as MFS resins). Sulfonated melamine-formaldehyde condensates and their preparation are described in, for example, CA 2 172 004 A1, DE 44 11 797 A1, U.S. Pat. Nos. 4,430,469, 6,555,683 and CH 686 186 and also in Ullmann's Encyclopedia of Industrial Chemistry, 5$^{th}$ Ed., vol. A2, page 131, and Concrete Admixtures Handbook—Properties, Science and Technology, 2$^{nd}$ Ed., pages 411, 412. Preferred sulfonated melaminesulfonate-formaldehyde condensates encompass (greatly simplified and idealized) units of the formula

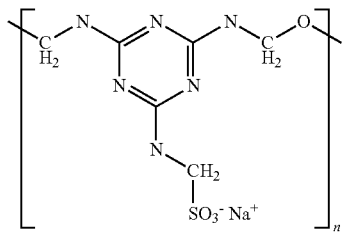

Melamine formaldehyde sulfite (MFS)

in which n stands generally for 10 to 300. The molar weight is situated preferably in the range from 2500 to 80 000. An example of melaminesulfonate-formaldehyde condensates are the products sold by BASF Constructoin Solutions GmbH under the Melment® name. Additionally to the sulfonated melamine units it is possible for other monomers to be incorporated by condensation. Particularly suitable is where n stands generally for 5 to 500. Lignosulfonates have molar weights of between 2000 and 100 000 g/mol. In general they are present in the form of their sodium, calcium and/or magnesium salts. Examples of suitable lignosulfonates are the products from the Norwegian company Borregaard LignoTech that are sold under the Borresperse commercial designation.

The c) sulfonated ketone-formaldehyde condensates, which can be used as dispersant together with the polycondensates according to this invention in a formulation, are products incorporating a monoketone or diketone as ketone component, preferably acetone, butanone, pentanone, hexanone or cyclohexanone. Condensates of this kind are known and are described in WO 2009/103579, for example. Sulfonated acetone-formaldehyde condensates are preferred. They generally comprise units of the formula (according to J. Plank et al., J. Appl. Poly. Sci. 2009, 2018-2024:

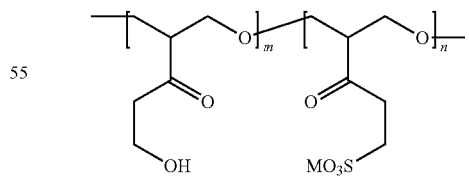

where m and n are generally each 10 to 250, M is an alkali metal ion, such as Na$^+$, and the ratio m:n is in general in the range from about 3:1 to about 1:3, more particularly about 1.2:1 to 1:1.2. Examples of suitable acetone-formaldehyde condensates are the products sold by BASF Construction Solutions GmbH under the Melcret K1L commercial designation. Furthermore, it is also possible for other aromatic units to be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid, for example.

The d) sulfonated naphthalene-formaldehyde, which can be used as dispersant together with the polycondensates according to this invention in a formulation are products obtained by sulfonation of naphthalene and subsequent polycondensation with formaldehyde. They are described in references including Concrete Admixtures Handbook Properties, Science and Technology, $2^{nd}$ Ed., pages 411-413 and in Ullmann's Encyclopedia of Industrial Chemistry, $5^{th}$ Ed., vol. A8, pages 587, 588. They comprise units of the formula

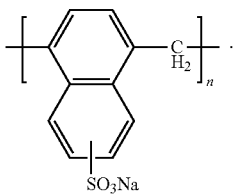

Typically, molar weights ($M_w$) of between 1000 and 50 000 g/mol are obtained. Examples of suitable β-naphthalene-formaldehyde condensates are the BASF Construction Solutions GmbH products sold under the Melcret 500 L commercial designation.

Furthermore, it is also possible for other aromatic units to be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid, for example.

The invention relates also to a process (A) for the production of a polycondensate according to this invention, wherein the following monomers are reacted in the presence of an acid catalyst (I) a monomer comprising an aromatic moiety bearing a polyether side chain comprising alkylene glycol units, with the proviso that the number of ethylene glycol units in the side chain is from 9 to 130 and that the content of ethylene glycol units is higher than 80 mol % with respect to all alkylene glycol units in the polyether side chain, (IIa) a monomer comprising an aromatic moiety bearing at least one phosphoric acid monoester group and/or its salt, (IIb) a monomer comprising an aromatic moiety with 6 carbon atoms, bearing at least one hydroxy group attached to the aromatic moiety and (III) the monomer formaldehyde.

The term "formaldehyde" comprises also oligomeric and polymeric precursors of formaldehyde, like for example trioxane and para-formaldehyde.

The invention relates also to a process (B) for the production of a polycondensate according to this invention, wherein the following monomers are reacted (Ia) a monomer comprising an aromatic moiety bearing a polyether side chain comprising alkylene glycol units, with the proviso that the number of ethylene glycol units in the side chain is from 9 to 50 and that the content of ethylene glycol units is higher than 80 mol % with respect to all alkylene glycol units in the polyether side chain and monomers (IIa), (IIb) and (III), which are the same as mentioned in the process (A).

Optionally aromatic monomers (IV) are used in each case of processes (A) and (B), which are different from the monomers (I), (IIa) and (IIb).

The monomers (I), (IIa), (III) (preferably formaldehyde, trioxan or para formaldehyde) and (IV) have been already described in the before standing text.

Preferably the process (A) and the process (B) for the production of a polycondensate according to this invention is done using one or more than one monomers (M-IIb) with a molar mass lower than 202 g/mol, more preferably lower than 182 g/mol. Preferably the solubility in water of the monomer (M-IIb) used in the process (A) or (B) is higher than 10 g/l, more preferably higher than 15 g/l, at 20° C., pH=4 and atmospheric pressure. Preferably the pH value for the polycondensation reaction is set to be lower than 1.

The monomer (IIb) can be preferably selected from the group of substituted or unsubstituted phenol, catechol, hydrochinone, benzene 1,2,3 triol, alkyl substituted phenols, preferably methyl substituted phenol, like for example ortho cresol, meta cresol and para cresol, 4-hydroxy phenol sulfonic acid, 3-hydroxy phenol sulfonic acid, 2-hydroxy phenol sulfonic acid, 3,4,5-trihydroxybenzenesulfonic acid, 2,4,5-trihydroxybenzenesulfonic acid, phenol 2,4-disulfonic acid and 3,4-dihydroxybenzenesulfonic acid. Preferable are phenol, catechol, hydrochinone, benzene 1,2,3 triol, methyl substituted phenols, like for example ortho cresol, meta cresol and para cresol, 4-hydroxy phenol sulfonic acid, 3-hydroxy phenol sulfonic acid and 2-hydroxy phenol sulfonic acid.

The acid catalyst can be selected from the group of strong mineral acids like sulfuric acid, HCl, or a sulfonic acid. Preferably the sulfonic acid is an alkylsulfonic acid and/or an aromatic sulfonic acid. More preferably the aromatic sulfonic acid bears at least one hydroxy group. Most preferable is a phenol comprising at least one hydroxy group and at least one sulfonic acid, in each case attached to the aromatic ring. For example, it can be selected from the group of 4-hydroxy phenol sulfonic acid, 3-hydroxy phenol sulfonic acid, 2-hydroxy phenol sulfonic acid, 3,4,5-trihydroxybenzenesulfonic acid, 2,4,5-trihydroxybenzenesulfonic acid, phenol 2,4-disulfonic acid and 3,4-dihydroxybenzenesulfonic acid. It is possible to use mixtures of the before mentioned acid catalysts. Preferable are 4-hydroxy phenol sulfonic acid and/or phenol 2,4-disulfonic acid. In particular, preferable is 2-hydroxy phenol sulfonic acid.

It has been found that the sulfonic acid group can act as an acid catalyst during the polymerization reaction. The aromatic sulfonic acid bearing at least one hydroxy group can lose its sulfonic acid group in a hydrolysis reaction (small amounts of water are usually present in the reaction) in which sulfuric acid is formed and the sulfonic acid group at the aromatic ring is replaced by hydrogen. Analytical results of copolymers obtained with phenol sulfonic acids (phenols comprising at least one hydroxy group and at least one sulfonic acid) show that the element sulfur could no more be detected by elemental analysis, which hints to the before mentioned hydrolysis process.

It should be pointed out that if the monomer (IIb) is a phenol comprising at least one hydroxy group and at least one sulfonic acid group, in each case attached to the aromatic ring, it is possible to do the polycondensation reaction without an extra addition of an (additional) acid catalyst, because the monomer (IIb) is acid enough to promote the polycondensation. One or more species of the before mentioned monomers can be used in the process.

Preferable is a process in which the acid catalyst is present in the form of the monomer (IIb), which is a phenol comprising at least one hydroxy group and at least one sulfonic acid group, in each case attached to the aromatic ring.

Advantage is that no separate acid catalyst is needed and that the catalyst is completely copolymerized into the copolymer. In contrast to the use of for example mineral acids no salts like for sodium sulfate are formed, when for example a sample produced with sulphuric acid is neutralized with sodium hydroxide. Phase separation problems (salt precipitation) in aqueous systems are common in such a case.

Preferably the process for the production of a polycondensate according to this invention is characterized in that the temperature is in the range from 80 to 140° C., preferably 100 to 120° C. More preferably the process is done under an atmosphere of nitrogen. Preferably the process is done under addition of sulfuric acid. It is also preferable to use no mineral acids as a catalyst.

The invention relates also to a building material mixture comprising one or more polycondensates according to this invention and one or more inorganic binders selected from the group of α-calcium sulfate hemihydrate, α-calcium sulfate hemihydrate, calcium sulfate in the form of anhydrite, slag sand, fly ash, fumed silica, blast furnace slag, natural pozzolanes, burnt oil shale and/or, (Portland) cement, preference being given to the presence of (Portland) cement with a proportion greater than 40% by weight based on the total amount of the inorganic binder.

The dosage of the polycondensates according to this invention is preferably in the range of 0.05 weight % to 1 weight %, with respect to the total amount of the inorganic binders. The dosage of the polycondensates according to this invention in concrete is more preferably in the range of 0.15 weight % to 0.5 weight %, with respect to the total amount of the inorganic binders. The building material mixtures can be for example concrete, mortar or grouts.

The invention relates also to the use of the polycondensates according to this invention for the dispersion of inorganic binders, selected from the group of α-calcium sulfate hemihydrate, α-calcium sulfate hemihydrate, calcium sulfate in the form of anhydrite, slag sand, fly ash, fumed silica, blast furnace slag, natural pozzolanes, burnt oil shale and/or (Portland) cement, preference being given to the presence of (Portland) cement with a proportion greater than 40% by weight based on the total amount of the inorganic binder.

The invention relates also to the use of the polycondensates according to this invention for increasing the strength development of concrete, in particular the strength development of concrete after 28 days.

The invention relates also to the use of the polycondensates according to this invention for improving the slump-retention of concrete.

EXAMPLES

General Phosphorylation Procedure:

A reactor, equipped with heating and stirrer is charged with 127 g of polyphosphoric acid (specified to have 85% $P_2O_5$ content). The content is heated to 100° C. 1 mol of an alcohol (e.g. phenoxyethanol) is added to the stirred reaction mixture through a period of 3 hours. After the addition is finished, the reaction mix is stirred for an additional hour. The obtained reaction product mainly consists of the phosphoric acid monoester (e.g. phenoxyethanol phosphate) and can be used without further purification as starting material for the following polycondensation step.

General Polycondensation Procedure:

A pressure proof and corrosion resistant reactor (glass-lined steel, tantalized steel or hastelloy reactor), equipped with stirrer and temperature control is charged with below listed starting materials in the given order: 1. Poly(ethylenoxid)monophenylether (Ph-PEG), 2. Phosphorylated Phenoxyethanol (PPE) or phosphorylated Phenoxydiglycol (PPD), 3. Paraformaldehyde (PF) or Formalin 37%, 4. Water, 5. 2-Phenolsulfonic acid (PSA) 65%. For the samples 1*, 3, 4* and 6* sulfuric acid and/or phenol were added in accordance with table 1. Upon completion of the addition of the acid, the reaction mix is heated to 100-120° C. After 1 to 4 hours the polycondensation reaction is finished, water is added and the polycondensate is neutralized with NaOH to pH 6-8. Finally, the solid content of the product is adjusted with water to 32%.

The molecular weights of the polymers were determined by using gel permeation chromatography method as described below.

Column combination: OH-Pak SB-G, OH-Pak SB 804 HQ and OH-Pak SB 802.5 HQ by Shodex, Japan; eluent: 80 Vol.-% aqueous solution of $HCO_2NH_4$ (0.05 mol/l) and 20 Vol.-% acetonitrile; injection volume 100 μl; flow rate 0.5 ml/min. The exact amounts of the starting materials are given in table 1 and the reaction conditions are summarized in table 2.

TABLE 1

Monomer composition of the polycondensates

| Example No. | Ph-PEG MW [D] | [g] | [mol] | PPE [g] | [mol] | PPD [g] | [mol] | Formalin PF [g] | 37% [ml] | Water [g] | PSA 65% [g] | [mol] | $H_2SO_4$ [g] | Phenol [g] | [mol] |
|---|---|---|---|---|---|---|---|---|---|---|---|---|---|---|---|
| 1* | 2000 | 500 | 0.25 | 109.7 | 0.5 | — | — | — | 61.0 | — | — | — | 25.5 | 23.5 | 0.25 |
| 2 | 2000 | 500 | 0.25 | 109.7 | 0.5 | — | — | 35.6 | — | — | 100.5 | 0.38 | — | — | — |
| 3 | 2000 | 500 | 0.25 | 109.7 | 0.5 | — | — | 35.6 | — | 30 | — | — | 38.3 | 35.3 | 0.38 |
| 4* | 750 | 600 | 0.8 | 104.8 | 0.48 | — | — | 40.4 | — | 9.6 | — | — | 24 | — | — |
| 5 | 750 | 488 | 0.65 | 85.1 | 0.39 | — | — | 45.2 | — | — | 104.5 | 0.39 | — | — | — |
| 6* | 5000 | 600 | 0.12 | 104.7 | 0.48 | — | — | — | 56.3 | — | — | — | 24.5 | — | — |
| 7 | 5000 | 600 | 0.12 | 52.4 | 0.24 | — | — | 24.7 | — | — | 112.6 | 0.42 | — | — | — |
| 8 | 5000 | 600 | 0.12 | 52.4 | 0.24 | — | — | 24.7 | — | — | 112.6 | 0.42 | — | — | — |
| 9 | 5000 | 600 | 0.12 | 47.2 | 0.22 | — | — | 24.7 | — | — | 119.0 | 0.44 | — | — | — |
| 10 | 5000 | 600 | 0.12 | 36.7 | 0.17 | — | — | 24.7 | — | — | 131.9 | 0.49 | — | — | — |

TABLE 1-continued

Monomer composition of the polycondensates

| | Ph-PEG | | | PPE | | PPD | | PF | Formalin 37% | Water | PSA 65% | | $H_2SO_4$ | Phenol | |
|---|---|---|---|---|---|---|---|---|---|---|---|---|---|---|---|
| Example No. | MW [D] | [g] | [mol] | [g] | [mol] | [g] | [mol] | [g] | [ml] | [g] | [g] | [mol] | [g] | [g] | [mol] |
| 11 | 5000 | 600 | 0.12 | — | — | 44.1 | 0.17 | 24.7 | — | — | 112.6 | 0.42 | — | — | — |
| 12 | 5000 | 600 | 0.12 | 104.7 | 0.48 | — | — | 32.2 | — | — | 112.6 | 0.42 | — | — | — |
| 13 | 5000 | 300 | 0.06 | 104.7 | 0.48 | — | — | 23.3 | — | — | 69.7 | 0.26 | — | — | — |

(*= comparative example)

TABLE 2

Reaction conditions and weight average molecular weight of the obtained polycondensates (*= comparative examples)

| Example No. | Reaction temperature [° C.] | Reaction time [min] | Molecular weight Polycondensate Mw [D] |
|---|---|---|---|
| 1* | 100 | 300 | 10.740 |
| 2 | 100 | 240 | 17,020 |
| 3 | 100 | 210 | 19,660 |
| 4* | 100 | 180 | 12,350 |
| 5 | 100 | 120 | 9,860 |
| 6* | 120 | 240 | 29,060 |
| 7 | 100 | 240 | 39,920 |
| 8 | 110 | 100 | 39,440 |
| 9 | 110 | 100 | 41,130 |
| 10 | 110 | 100 | 43,890 |
| 11 | 110 | 100 | 42,560 |
| 12 | 100 | 60 | 22,300 |
| 13 | 100 | 60 | 27,860 |

Given the results summarized in table 2, it can be concluded that the use of phenolsulfonic acid leads to a significant increase of the polycondensation speed.

Considering the series of polycondensates with the same monomer (I) (Ph-PEG with 5,000 g/mol) it was found that, whereas in case of comparative example 6* 4 hours reaction time at a temperature of 120° C. were required in order to obtain a polycondensate with a desired molecular weight of around 40,000 g/mol, a similar result was obtained in case of examples 7 to 13 at a lower reaction temperature and a significantly shorter reaction time.

With respect to the series of polycondensates 1*, 2 and 3 with the same monomer (I) (Ph-PEG with 2,000 g/mol) it was possible to obtain at the same temperature of 100° C. a higher molecular weight (17,020 for sample 2 and 19,660 for sample 3), compared to the comparative example 1*, which resulted only in 10,740 g/mol. It is noted that the polycondensation time of 1* was even considerably longer (300 min) compared to samples 2 (240 min) and 3 (210 min).

This invention therefore allows to significantly increase the throughput of a polycondensation plant with given specifications and it allows to reduce energy costs accordingly.

Application Tests:

Two different concrete mixes were used to evaluate the admixtures:

Concrete mixture A: 1020 kg/m³ Crushed aggregate, 846 kg/m³ Sand, 350 kg/m³ portland cement (Bernburg CEM I 42.5 R), 50 kg/m³ Limestone powder; w/c=0.44)

Concrete mixture B: 867 kg/m³ Crushed aggregate, 988 kg/m³ Sand, 380 kg/m³ portland cement (Bernburg CEM I 42.5 R), w/c=0.44

The spread of concrete (15 shocks) was adjusted with the respective polycondensate samples (according to DIN EN 12350) to obtain values of 60±3 cm.

The concrete flow test results are summarized in table 3. All polymers were formulated with 1% of a silicon-based defoamer in order to reduce the air entrainment into the concrete to less than 3%. Dosages are given as solid content by weight of cement content of the concrete mix.

TABLE 3

Concrete flow test for concrete mixture A (*= comparative examples)

| Example No. | Dosage [%; b.w.o.c.] | Spread [cm] | | |
|---|---|---|---|---|
| | | 5 min | 15 min | 30 min |
| 1* | 0.370 | 60.5 | 50.0 | 41.0 |
| 2 | 0.195 | 62.5 | 52.0 | 40.0 |
| 3 | 0.215 | 60.5 | 48.5 | 35.5 |
| 4* | 0.370 | 60.0 | 57.5 | 51.5 |
| 5 | 0.320 | 60.0 | 58.5 | 52.5 |

The concrete tests show that the admixtures according to this invention are able to provide equivalent flow properties of the fresh concrete, but at significantly reduced dosage compared to the comparative examples. Moreover, example 5 additionally provides an improved workability retention compared to the comparative example 4* at 13.5% reduced dosage.

In a second test (Table 4) the strength development of the concrete was evaluated. Comparing Examples 7 to 13 with comparative example 6* reveals a higher dose efficiency of the inventive examples and a significantly increased compressive strength after 28 days:

TABLE 4

Concrete compressive strength evaluation for concrete mixture B (*= comparative example).

| Example No. | Dosage [%; b.w.o.c.] | Spread [cm] | Compressive strength after 28 days [mPas] | Density after 28 days [kg/dm³] |
|---|---|---|---|---|
| 6* | 0.175 | 62.0 | 51.85 | 2.401 |
| 7 | 0.155 | 61.0 | 64.85 | 2.400 |
| 8 | 0.165 | 61.5 | 65.10 | 2.400 |
| 9 | 0.165 | 61.5 | 64.35 | 2.395 |
| 10 | 0.175 | 61.5 | 64.65 | 2.397 |
| 11 | 0.170 | 60.0 | 63.75 | 2.395 |
| 12 | 0.165 | 62.0 | 66.95 | 2.402 |
| 13 | 0.170 | 60.5 | 65.23 | 2.403 |

The invention claimed is:

1. A polycondensate containing
   (I) at least a structural unit, which is an aromatic moiety bearing a polyether side chain comprising alkylene glycol units, with the proviso that the number of ethylene glycol units in the side chain is from 9 to 130 and that the content of ethylene glycol units is higher than 80 mol % with respect to all alkylene glycol units in the polyether side chain, (IIa) at least a structural unit, which is an aromatic moiety bearing at least one phosphoric acid monoester group and/or its salt, with the proviso that the molar ratio of (IIa):(I) is from 0.25 to 8, (IIb) at least a structural unit with a molar mass lower than 200 g/mol, which is an aromatic moiety with 6 carbon atoms bearing at least one hydroxy group attached to the aromatic moiety with the proviso that the molar ratio of (IIa):(IIb) is from 0.2 to 1.5, (III) at least a methylene unit (—CH$_2$—), which is attached to two aromatic structural units Y, where aromatic structural units Y, independently of one another, are identical or different and are represented by structural unit (I), structural unit (IIa), structural unit (IIb) or optionally (IV) aromatic structural units of the polycondensate, which are different from structural unit (I), structural unit (IIa) and structural unit (IIb).

2. The polycondensate according to claim 1, in which a monomer (M-IIb) is used for the introduction of the structural unit (IIb) in a polycondensation reaction leading to the polycondensate and the solubility of the monomer (M-IIb) in water is higher than 10 g/l at pH=4, 20° C. and atmospheric pressure.

3. The polycondensate according to claim 1, in which the solubility in water of the polycondensate is higher than 300 g/l, the solubility of the polycondensate being measured at 20° C., atmospheric pressure and a pH of 4.

4. The polycondensate according to claim 1, in which the structural units (I), (IIa) and (IIb) are represented by the following general formulae

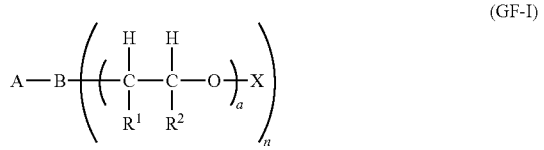
(GF-I)

where

A are identical or different and are represented by a substituted or unsubstituted aromatic or heteroaromatic compound having 5 to 10 atoms in the aromatic ring, where B are identical or different and are represented by N, NH or O, where n=2 if B=N and n=1 if B=NH or O, where R$^1$ and R$^2$, independently of one another, are identical or different and are represented by a branched or straight-chain C$_1$- to C$_{10}$-alkyl radical, C$_5$- to C$_8$-cycloalkyl radical, aryl radical, heteroaryl radical or H, with the proviso that the content of ethylene glycol units is higher than 80 mol % with respect to all alkylene glycol units in the polyether side chain, where a are identical or different and are represented by an integer from 9 to 130, where X are identical or different and are represented by a branched or straight-chain C$_1$- to C$_{10}$-alkyl radical, C$_5$- to C$_8$-cycloalkyl radical, aryl radical, heteroaryl radical or H,

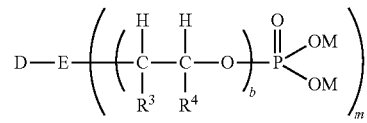
(GF-IIa)

where

D are identical or different and are represented by a substituted or unsubstituted heteroaromatic compound having 5 to 10 atoms in the aromatic ring, where E are identical or different and are represented by N, NH or O, where m=2 if E=N and m=1 if E=NH or O, where R$^3$ and R$^4$ independently of one another, are identical or different and are represented by a branched or straight-chain C$_1$- to C$_{10}$-alkyl radical, C$_5$- to C$_8$-cycloalkyl radical, aryl radical, heteroaryl radical or H, where b are identical or different and are represented by an integer from 1 to 20, where M independently of one another is identical or different and is H or a cation equivalent, (GF-IIb)

F—OH where

F is represented by an aromatic moiety with 6 carbon atoms in the aromatic ring.

5. The polycondensate according to claim 1, in which the structural unit (IIa) is an alkoxylated, hydroquinone phosphoric acid monoester according to the following general formula (GF-V)

-[[M$_2$O$_3$P-(AO)$_p$]—O—C$_6$H$_2$—O-[(AO)$_p$—PO$_3$M$_2$]]-, (GF-V)

p is an integer from 1 to 20, A is an alkylene with 2 to 5 carbon atoms, M independently of one another is identical or different and is H or a cation equivalent.

6. The polycondensate according to claim 1, in which the weight average molecular weight (Mw) of the polycondensate is from 8,000 g/mol to 70,000 g/mol.

7. The polycondensate according to claim 1, in which the structural unit (I) is derived from an alkoxylated aromatic alcohol monomer bearing a hydroxyl group at the end of the polyether side chain.

8. The polycondensate according to claim 1, in which the structural unit (I) is a phenyl poly alkylene glycol.

9. The polycondensate according to claim 1, in which the structural unit (IIa) is derived from an aromatic alcohol monomer, which was in a first step alkoxylated, and the obtained alkoxylated aromatic alcohol monomer bearing a hydroxyl group at the end of the polyether side chain was in a second step phosphorylated to yield the phosphoric acid monoester group.

10. The polycondensate according to claim 1, in which the molar ratio of the sum of structural unit(s) (I), (IIa) and (IIb) to the structural units (IV) is higher than 1/1.

11. The polycondensate according to claim 1, where in (I) the number of ethylene glycol units in the side chain is from 9 to 50 and the content of ethylene glycol units is higher than 80 mol % with respect to all alkylene glycol units in the polyether side chain, and wherein the polycondensation degree of the polycondensate containing the units (I), (IIa), (IIb) and optionally (IV) is in the range from 10 to 75.

12. A process (A) for the production of the polycondensate according to claim 1, wherein the following monomers are reacted in the presence of an acid catalyst:
- (I) a monomer comprising an aromatic moiety bearing a polyether side chain comprising alkylene glycol units, with the proviso that the number of ethylene glycol units in the side chain is from 9 to 130 and that the content of ethylene glycol units is higher than 80 mol % with respect to all alkylene glycol units in the polyether side chain,
- (IIa) a monomer comprising an aromatic moiety bearing at least one phosphoric acid monoester group and/or its salt,
- (IIb) a monomer comprising an aromatic moiety with 6 carbon atoms, bearing at least one hydroxy group attached to the aromatic moiety and
- (III) the monomer formaldehyde.

13. The process according to claim 12, characterized in that the acid catalyst is present in the form of the monomer (IIb), which is an aromatic moiety with 6 carbon atoms, comprising at least one hydroxy group and at least one sulphonic acid group, in each case attached to the aromatic ring.

14. A building material mixture comprising one or more polycondensates according to claim 1 and one or more inorganic binders selected from the group of α-calcium sulfate hemihydrate, β-calcium sulfate hemihydrate, calcium sulfate in the form of anhydrite, slag sand, fly ash, fumed silica, blast furnace slag, natural pozzolanes, burnt oil shale, and cement, optionally wherein Portland cement is present in a proportion greater than 40% by weight based on the total amount of the inorganic binder.

15. A method comprising dispersing with the polycondensates according to claim 1, inorganic binders, selected from the group of α-calcium sulfate hemihydrate, β-calcium sulfate hemihydrate, calcium sulfate in the form of anhydrite, slag sand, fly ash, fumed silica, blast furnace slag, natural pozzolanes, burnt oil shale, cement, and mixtures thereof, optionally wherein Portland cement is present in a proportion greater than 40% by weight based on the total amount of the inorganic binder.

16. A process (B) for the production of the polycondensate according to claim 12, wherein the following monomers are reacted:
- (Ia) a monomer comprising an aromatic moiety bearing a polyether side chain comprising alkylene glycol units, with the proviso that the number of ethylene glycol units in the side chain is from 9 to 50 and that the content of ethylene glycol units is higher than 80 mol % with respect to all alkylene glycol units in the polyether side chain,
- (IIa) a monomer comprising an aromatic moiety bearing at least one phosphoric acid monoester group and/or its salt,
- (IIb) a monomer comprising an aromatic moiety with 6 carbon atoms, bearing at least one hydroxy group attached to the aromatic moiety and
- (III) the monomer formaldehyde.

17. The polycondensate according to claim 1, wherein the molar ratio of (IIa):(IIb) is from 0.2 to 1.2.

\* \* \* \* \*

UNITED STATES PATENT AND TRADEMARK OFFICE
CERTIFICATE OF CORRECTION

| | | |
|---|---|---|
| PATENT NO. | : 11,485,683 B2 | Page 1 of 1 |
| APPLICATION NO. | : 16/062465 | |
| DATED | : November 1, 2022 | |
| INVENTOR(S) | : Alexander Kraus et al. | |

It is certified that error appears in the above-identified patent and that said Letters Patent is hereby corrected as shown below:

In the Claims

Claim 16, Column 28, Line 13 should recite:
according to claim 11, wherein the following monomers are Signed and Sealed this
Eighth Day of August, 2023

*Katherine Kelly Vidal*

Katherine Kelly Vidal
*Director of the United States Patent and Trademark Office*